United States Patent [19]
Brand

[11] 3,802,312
[45] Apr. 9, 1974

[54] BRAIDING MACHINE
[75] Inventor: Karl Brand, Ebern, Germany
[73] Assignee: Kugelfischer Georg Shafer & Co., Schweinfurt, Germany
[22] Filed: Apr. 17, 1972
[21] Appl. No.: 244,553

[30] Foreign Application Priority Data
Feb. 28, 1972 Germany............................ 2209415

[52] U.S. Cl. ...................................... 87/29, 87/33
[51] Int. Cl. ........................... D04c 3/08, D04c 3/12
[58] Field of Search ............ 57/15; 87/6, 23, 29, 33, 87/34

[56] References Cited
UNITED STATES PATENTS
2,918,777  12/1959  Reeve et al. ........................ 87/29 X
937,021    10/1909  Cobb ................................. 87/29 UX
2,714,414   8/1955  Ganahl et al. ..................... 57/15 UX
2,732,884   1/1956  Vanzo ................................ 57/15 X
3,099,932   8/1963  Ege et al. ........................... 87/29 X Primary Examiner—John Petrakes
Attorney, Agent, or Firm—Clelle W. Upchurch

[57] ABSTRACT

The invention relates to a machine which braids fibers around a hose to form a braided sleeve thereon, especially for reinforcing purposes. A braiding head is provided for each ply of braiding which is to be formed, the heads being coaxially aligned one behind the other. According to the invention, the respective heads are mounted on a frame which is rigidified by braces.

5 Claims, 2 Drawing Figures

BRAIDING MACHINE

The present invention relates to a braiding machine for braiding the braid ties of hoses having at least tow plies of braiding, particularly brake hoses, in which connection for each ply of braiding there is provided a braiding head which consists of a plurality of intermeshing, driven gears arranged coaxially to a hose guide, index discs fastened thereto and a cam plate for the guideing of a plurality of bobbins moved by the index discs in an undulated circular path around the hose guide, and in which the braiding heads are arranged aligned one behind the other in the direction of withdrawal of the hose.

Such machines are used in the manufacture of hoses which contain a plurality of plies of braid for reinforcement and as a rule a core, an outer sleeve and between every two adjacent plies of braid an intermediate layer of a flexible material, for instance a flexible plastic. Brake hoses for hydraulic brake systems of automotive vehicles are, for instance, constructed in this manner, in which connection the individual plies of flexible material must have specific properties, the core and the intermediate layers must in particular be as impervious to liquid as possible and the outer sleeve must in particular be as resistant to abrasion as possible. Such brake hoses as a rule have two plies of braid or, for maximum pressures, three plies of braid.

In the manufacture of the hose, the core is first of all extruded on a mandrel. It then passes, possibly still seated on the mandrel, into the braiding machine in which the core is wrapped with the desired number of plies of braiding. The plies of braiding are naturally braided one after each other and between every two successive braidings there is applied an intermediate layer, for instance by the immersion process. The outer sleeve is finally applied.

Each ply of braiding is applied by a braiding head. The latter consists of a plurality of meshing gears arranged on a common pitch circle coaxial to a hose guide, one of which gears is driven from a drive motor and drives the others. To each gear there is coaxially fastened an index disc developed in the manner of a Maltese cross, arranged at distance from the corresponding gear. Between the gears on the one hand and the index discs on the other hand there is fastened in fixed position a cam plate which serves for the holding and guiding of a plurality of bobbins from which the threads are withdrawn to form the corresponding ply of braid. The bobbins are moved by the index disc rotating together with the corresponding gear around a fixed axis in the cam plate in a path which extends in undulated fashion along the pitch circle of the gears and index discs.

Associated with each index disc are two diametrically opposite bobbins which in each case are movable in the cam plate in another of two undulated paths. Each path moves with successive semicircular undulation arcs past two adjacent index discs on the outside and inside. The two paths are identical shape and turned opposite to each other around an index disc so that they in each case intersect between two adjacent index discs. As each of these points of intersection there is installed a switch piece which assures the continuity of the two paths at the point of intersection in question.

The bobbins, each of which bears a yarn spool and a yarn guide, are in each case inserted by means of a foot pin in one of the radial recesses of one of the index discs and are thus carried along and axially guided by same. As already mentioned, with each dividing disc there are associated two diametrically opposite bobbins, each movable in a different one of the two undulated paths. In operation the two bobbins travel in opposite direction around the wrapped hose, passing alternately on the outside and inside and inside and outside respectively past all index discs of the corresponding braiding head, in which connection furthermore the yarn spool turns on each bobbin and yarn leaves it.

As a result, the alternate mutual moving over and below of the yarns in the braid ply formed results. If the specific braiding head has, for instance, twelve gears and accordingly twelve index discs, then therefore twenty-four bobbins are moved simultaneously in the manner described so as to result in a braiding ply with twelve braid lines lying alongside of each other, as is true, for instance, in the case of a brake hose.

The dimensions of each braiding head in the direction of removal of the hose are very small as compared with the height; for instance, the ratio of width in the direction of withdrawal of the hose to height of the braiding head is about 1:15. The height of the braiding head depends on the size of the pitch circle of the corresponding gears or index discs and the latter in turn depend on the number and size of the gears and index discs respectively.

In the known braiding machines of the type discussed at the start, the braiding heads are arranged in self-supporting manner and each is provided on a vertical column which is fastened at its bottom on a base plate which also bears the drive, consisting of transmissions and motor, for the braiding heads and a hose removing device which assures a movement of the hose through the machine with a uniform speed of, for instance, 300 mm/min.

The said narrow construction of the braiding heads in combination with their free standing arrangement brings about in operation a considerable lack of steadiness in each braiding head upon the rotation of the bobbins. The bobbins are not balanced by the eccentrically located yarn spool, the weight of which changes due to the departure of the yarn and the eccentrically located yarn guide. Therefore, wider oscillations occur which are furthermore amplified by the alternating travel of each bobbin out of the pitch circle of the gears and index discs of the corresponding braiding head upon undulatory rotation around the hose. The unstable column construction and the imbalances of the bobbins limit the speed of rotation of each bobbin around the hose and the speed of rotation of the yarn spools, i.e., the speed of rotation of the yarn spool, rotating around its own axis, of the corresponding bobbin. In this way the output of the known braiding machines is greatly limited.

Furthermore, the following is disadvantageous. Each bobbin slides by means of a base plate on the surface — facing the index discs of the corresponding braiding head — of the cam plate of said braiding head and engages by means of the foot pin into the guide path cut therein. The oscillations in the entire braiding head and in the bobbin itself act on the weakest member, namely this foot pin. The continuous alternating stresses frequently lead to the breaking of the foot pin. The bobbin which then flies away is generally caught in the entire set of bobbins of the corresponding braiding head and frequently damages the latter to such an extent that a large number of bobbins becomes unusable. In the same manner there is the danger of the breaking off of the guide pin of each bobbin which is present on the side facing away from the foot pin and bears the yarn spool. All of this is detrimental for many reasons, and particularly also because, upon each break, the braiding machine must be stopped for a longer or shorter period of time.

The object of the invention is to eliminate these disadvantages and to provide a braiding machine for the aforementioned type which permits of considerably higher speeds of rotation of revolution of the bobbins of each braiding head around the core of the hose and speeds of rotation of the yarn spools around their own axis, and thus also considerably faster removal of the hose through the machine and therefore produces a high increase in output.

This result is obtained in accordance with the invention in the manner that the braiding heads are each arranged on a vertical support plate of a box-like rack with lower, upper and possibly lateral longitudinal braces. In this way great stability is assured so that vibrations of the individual braiding heads and of their bobbins are excluded even with increased speed of rotation of the bobbins and speed or revolution of the yarn spools so that even in such case the breaks described do not occur. In view of this, the speed of withdrawal of the hose through the machine can be increased considerably, for instance from 300 to 500 mm/min.

Of particular advantage is the embodiment of the invention in which, for the simultaneous braiding of the braiding plies of a plurality of hoses there are provided on each support plate a number of braiding heads equal to the number of hoses to be produced. In this connection the braiding heads can be arranged alongside of each other in each support plate and/or above one another. For example, in the latter case each of the support plates can have two braiding heads arranged one above the other so that a two-story braiding machine results, one hose core being wrapped in each story. If in addition, for example, two braiding heads are arranged alongside of each other on each support plate in each story, four hose cores can be wrapped simultaneously.

This not only results in the advantages described but also produces a considerable saving in space and furthermore facilitates supervision. For the last-mentioned purpose there is advantageously furthermore provided an operating platform which is vertically movable on the rack in that embodiment of the braiding machine of the invention which is characterized by the story-type construction described.

Permanent supervision by personnel is necessary despite continuous operation over a large number of yards manufactured since breaks in the yarn and yarn splicings must be eliminated and yarn spools replaced. Ordinarily in the known braiding machines, one operator is in charge of several machines which are arranged alongside of each other, but he is impeded in his action by the cores which enter centrally into each machine and hoses passing, also centrally, out of each machine. These obstacles are excluded in particular in the case of the multiply-story embodiment of the braiding machine of the invention.

One embodiment of the braiding machine of the invention will now be described by way of example with reference to the accompanying drawing, in which.

Figure 1:
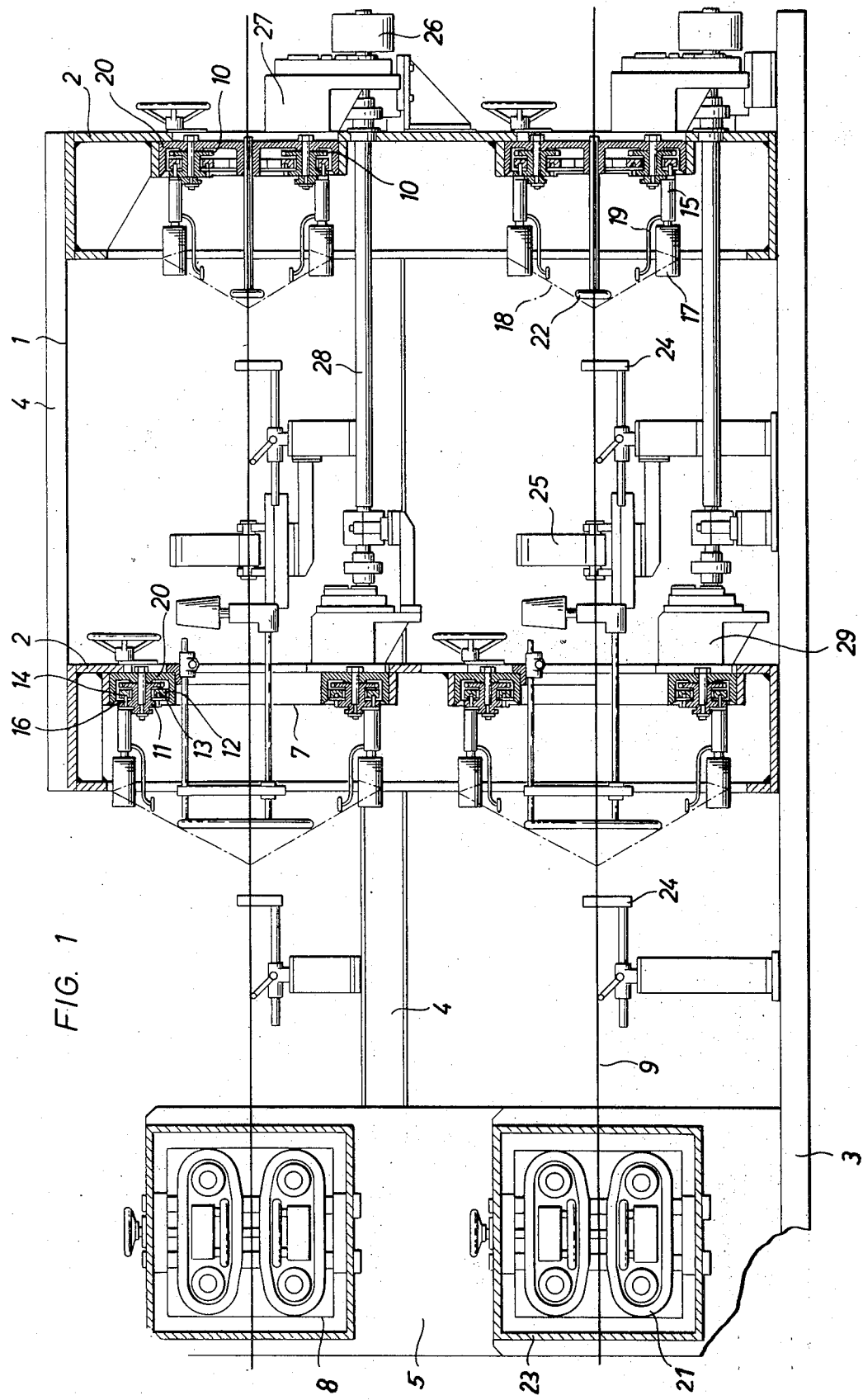
FIG. 1 is a partial side view in longitudinal section of a braiding machine in accordance with the invention having two stories, in each of which there are provided two braiding heads aligned with each other and a hose removal device.

The braiding machine has a frame 1 with two vertical support plates 2, a base plate 3 as well as two upper and two lateral longitudnal braces 4. The support plates 2 are each welded together from steel plates but may also be cast in a single piece. The longitudinal braces 4 are formed of channel irons and are bolted together to the support plates 2 but may also be of different development and be welded to the support plates 2.

The base plate 3 and the lateral longitudinal braces 4 are longer than the upper longitudinal braces 4 and at the ends protuding with respect to the braces are bolted together in each case to a vertical box-shaped housing 5. In this way high stability of the closed, box-shaped frame 1 is assured.

In each story above the base plate 3 and above the pair of lateral longitudinal braces 4 there are arranged in each case two braiding heads 7 and a hose withdrawing device 8 aligned one behind the other. Each braiding head 7 consists of a plurality of intermeshing gears 10 arranged coaxial to the hose core (not shown) which moves along the line 9 through the braiding machine in each story; of Maltese cross-like index discs 11 fastened axially spaced apart thereto, and of a cam plate 12 with two undulatory paths 13 and 14 which are, for instance, milled in said plate and are spaced at an angle to each other around an index disc, into which paths there engage by a foot pin 16 half of all the bobbins 15 present per braiding head. On each bobbin 15 there is seated a yarn spool 17 from which a yarn 18 is withdrawn. Each bobbin 15 furthermore has a yarn guide 19 and lies in one of the radial recesses of one of the index discs 11.

The cam plate 12 is bolted to a ring 20 which also bears the gears 10 with index discs 11 and is fastened to the adjacent support plate 2. In operation the bobbins 15 of each braiding head 7 travel in the manner described above around the line 9 and the hose core (not shown). The speed of rotation depends on the desired longitudinal angular position of the threads in the braiding produced by the corresponding braiding head 7 since this longitudinal angular position results from the mutual relationship of the speed of withdrawal of the hose core through the braiding machine and the bobbin speed of rotation. In the normal case, for instance in the manufacture of brake hoses, the bobbins 15 of the first braiding head, i.e. that to the right of FIG. 1, travel faster than the bobbins 15 of the second braiding head 7 in order to obtain the required elongation and pressure behavior in the finished brake hose. In the case of special hoses, however, the bobbins 15 of the second or a third braiding head 7 of each story can also rotate faster than those of the first braiding head 7. In this connection the number of bobbins is the same for all the braiding heads 7.

In the embodiment shown in the drawing, the first braiding head 7 of each story has less bobbins 15 than the corresponding second braiding head 7 so that the pitch diameter of the gears 10 and index discs 11, i.e. the diameter of the pitch circle on which the gears 10 and index discs 11 lie, is correspondingly reduced, so that the braiding head 7 also is. In this way the speed of rotation of the bobbins 15 off the first braiding head 7 can be further increased on bases of the lesser imbalance or the lesser effects thereof and also the speed of rotation of the bobbins 15 of the second braiding head 7 in corresponding manner. Naturally the first braiding ply thus contains fewer lines of yarns than the second.

Figure 2:
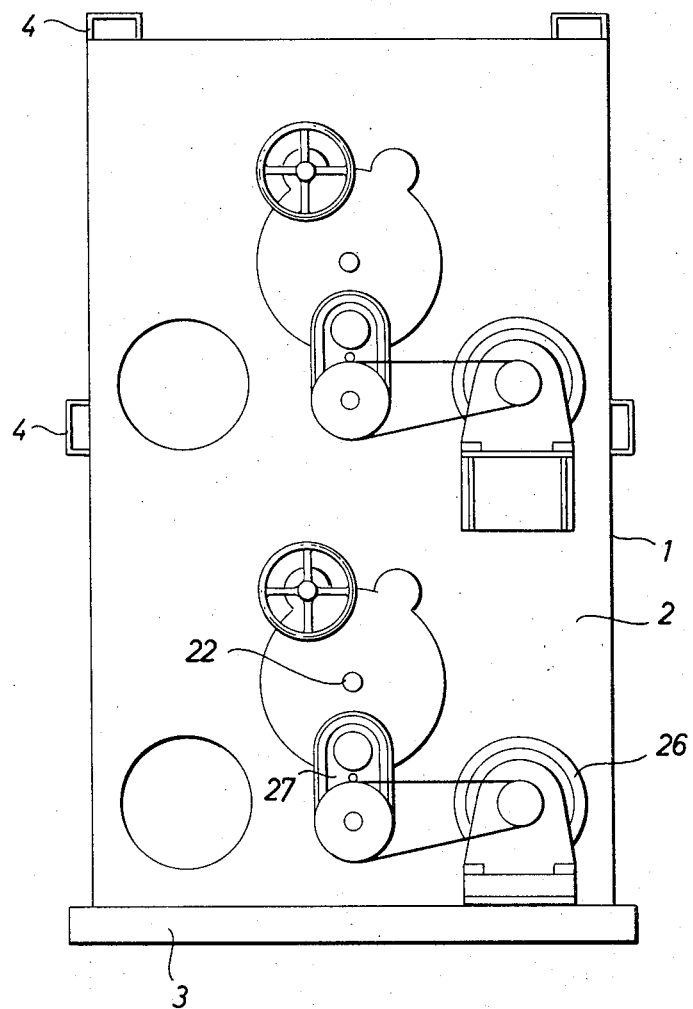
FIG. 2 is a right end view of the braiding machine of FIG. 1.

For example, the first braiding heads 7 of each story of the braiding machine of the invention in accordance with FIGS. 1 and 2 can have twelve bobbins which travel with a speed of 42.6 rpm around the line 9 or the hose core (not shown), while the second braiding heads 7 can have twenty-four bobbins which travel with a speed of 30.8 rpm.

The speed of rotation of the bobbins KU (bobbin revolutions/min) results from the formula $S = V/KU$, in which $V$ = speed of withdrawal of the hose (mm/min) and $S$ = axial length (mm) of one turn of each yarn of that braiding ply which is produced with the bobbins 15 of this speed of rotation KU. By axial length of turn there is to be understood in this connection the distance between the two ends of a turn in the direction of the longitudinal axis of the hose. With the aforementioned hose withdrawal speed $V = 500$ mm/min and an axial length of turn $S_1 = 11.75$ mm, as well as $S_2 = 16.25$ mm for the inner and outer braid plies respectively of the hose produced on the machine in accordance with FIGS. 1 and 2 — which lengths are customary for brake hoses — there result the above bobbin rotation speeds $KU_1 = V/S_1 = 500/11.75 = 42.6$ rpm and $KU_2 = V/S_2 = 500/16.25 = 30.8$ rpm for the first and second braid-braiding heads 7 of each story.

The bobbins 15 of each braiding head 7 are each placed in rotation by all gears 10 thereof, namely each bobbin 15 is moved by a gear 10 one after the other by means of the index disc 11 of the corresponding gear 10. The bobbin 15, however, not participating in a complete rotation of the corresponding gear 10 but being taken up after a fraction of a revolution of the gear, for instance, about half a revolution of the gear, by the index disc 11 of the adjacent gear 10 of the same briading head 7. With due consideration of these circumstances, the speed of rotation $n$ (rpm) for all gears 10, i.e. for each gear 10, of a braiding head 7 results from the formula $n = KU \cdot Z/2$, in which Z is a number of gears 10 lying in the pitch circle of the braiding head 7.

With the above-indicated bobbin speeds of rotation KU and number of bobbins 15 which are in each case twice as large as the number of the corresponding gears 10, one obtains for the first and second braiding heads 7 of each story of the braiding machine of FIGS. 1 and 2 a gear speed of rotation $n_1 = 642.6 \cdot 6/2 = 127.8$ rpm and $n^2 = 30.8 \cdot 12/2 = 184.8$ rpm.

In known braiding machines with two equally large braiding heads arranged one behind the other, each having twenty-four bobbins, only a hose withdrawal speed V of maximum 300 mm/min with bobbin rotation speeds $KU_1 = 25.5$ rpm and $KU_2 = 18.5$ rpm on the first and second braiding heads respectively are possible. On the other hand, a braiding machine in accordance with the invention having also two equally large braiding heads 7 provided one behind the other, which heads also have twenty-four bobbins 15, each can be operated with a hose withdrawal speed V of at least 450 mm/min with bobbin rotation speeds $KU_1 = 38.3$ rpm and $KU_2 = 27.7$ rpm on the first and second braiding heads respectively.

The above calculations also make it clear that in the embodiment of the braiding machine of the invention in which the number of bobbins 15 on the first braiding head 7 is less than on the second braiding head 7, higher speeds are permissible since the said imbalances act to a lesser extent on the first braiding head 7 of smaller pitch circle.

In accordance with FIG. 2, the hose withdrawal device 8 in each story is developed as a caterpiller withdrawal device with two opposite, driven endless caterpillar tracks 21 between which the hose is passed and grasped in order in this way to be drawn through the two braiding heads 7 with constant speed. The hose core is introduced in each story through a guide 22. The two hose withdrawal devices 8 are each arranged in a transverse box 23 of the housing 5. The latter therefore also acts to stiffen the frame 1.

In each story hose guides 24 are provided between the two braiding heads 7 and between the second braiding head 7 and the hose withdrawal device 8 respectively, while furthermore between the two braiding heads 7 there is provided a device 25 for applying an intermediate layer between the two braid plies produced by the successive braiding heads 7.

Each story has associated with it a drive motor 26 which, via a transmission 27, drives the gears 10 of the first braiding head 7, and furthermore via a shaft 28 and a transmission 29 drives the gears 10 of the second braiding head 7, in the case of each of the two sets of gears 10, one of said gears being driven by the corresponding transmission 26 and 29 respectively in order in its turn to drive the remaining gears 10 of the corresponding set. Between motor 26 and transmission 27 and between shaft 28 and transmission 29 there is in each case interposed a clutch.

Instead of this, each braiding head 7 could also have associated with it its own drive motor or else a single motor could be provided for driving all the braiding heads of a braiding machine.

In the operation of the braiding machine of the invention shown in FIGS. 1 and 2, two hose cores, while possibly still seated on a steel mandrel, are provided simultaneously with two plies of braid. In each of the two stories, the hose core travels in succession through the first braiding head 7 with guide 22, the guide 24, the device 25, the second braiding head 7, the guide 24 and the hose removing device 8.

There has not been shown in the drawing the operating scaffold which is movable vertically on the frame 1, for instance being hydraulically actuated, by means of which an operator arrives at the higher story.

What is claimed is:

1. Braiding machine for the simultaneous braiding of the braid plies of a plurality of hoses each having at least two braid plies, which machine comprises for each ply of braid a braiding head which consists of a plurality of intermeshing, driven gears arranged coaxially to a hose guide, index discs fastened to said gears, and a cam plate for guiding a plurality of bobbins drivingly connected to said index discs to move in an undulatory circular path around the hose guide, wherein the braiding heads for each hose to be produced are aligned one behind the other in the direction of withdrawal of the hose, and characterized by a box-shaped frame having vertical support plates and lower and upper laterally spaced longitudinal braces, on each said support plate there being arranged a number of braiding heads equal to the number of hoses to be produced.

2. Braiding machine according to claim 1, having several braiding heads arranged one above the other on each support plate and including an operating platform which is movable vertically on the frame.

3. The braiding machine of claim 1 wherein braiding heads are arranged on each plate one above the other.

4. An apparatus for braiding fibers about a hose to form a braided reinforcing sleeve thereabout, said apparatus comprising a rigid frame having a longitudinally extending base, a pair of longitudinally spaced plates rigidly secured at their lower ends to said base and having top ends disposed above the base, a first pair of laterally spaced rigid longitudinally extending brace members spanning the space between said plates and rigidly secured to the top ends thereof and a second pair of longitudinally extending brace members intermediate said base and said first pair spanning the space between said plate with one brace of said second pair being rigidly secured to one side of each plate and the other brace of said second pair being secured to the opposite side of each plate, an opening through each of said plates, and secured to each of the plates adjacent to a said opening, a braiding head having a hose guide, a plurality of intermeshing driven gears disposed coaxially to the hose guide, index discs fastened to said gears, a plurality of bobbins drivingly connected to the index discs, and a cam for guiding the bobbins about an undulatory circular path about the hose, the braiding head carried by one plate being aligned with the braiding head of the other plate, and means for drawing the hose through the braiding heads.

5. The apparatus of claim 4 wherein each of said plates carries at least two vertically spaced braiding heads.

* * * * *